United States Patent [19]

Greenhill, Sr. et al.

[11] Patent Number: 4,706,359
[45] Date of Patent: Nov. 17, 1987

[54] MOUNTING UTILITY BOXES, PANELS, AND THE LIKE

[76] Inventors: Daniel J. Greenhill, Sr., P.O. Box 1074; Alfred J. Moore, Jr., P.O. Box 1903, both of Riverview, Fla. 33569

[21] Appl. No.: 902,731

[22] Filed: Sep. 2, 1986

[51] Int. Cl.[4] ............................................. B25B 27/14
[52] U.S. Cl. .................................... 29/271; 29/281.5; 29/464; 248/DIG. 6; 269/904
[58] Field of Search ..................... 29/270, 271, 281.5, 29/464; 33/DIG. 10; 269/48.1-48.4, 97, 904; 52/126.2, DIG. 1; 248/DIG. 6

[56] References Cited

U.S. PATENT DOCUMENTS 2,140,861 12/1938 Steketee .................... 248/DIG. 6
2,713,983  7/1955 Kay ........................... 248/DIG. 6
3,522,658  8/1970 Howell ...................... 33/DIG. 10

Primary Examiner—Gil Weidenfeld
Assistant Examiner—Steven C. Bishop
Attorney, Agent, or Firm—Charles A. McClure

[57] ABSTRACT

Means and method for mounting utility boxes, panels, or like housings, as between studding in the framework of a building. A self-supporting tool is provided that can be interposed manually between a pair of flanking wooden studs or equivalent vertical structural members at desired height and depth of insertion. The tool, when manually released, engages the studs forcibly enough, as by indenting their sides, to be held in place while a utility box or panel is placed on the tool by the user of the tool, who then secures the box or panel in place by inserting fastening means, such as nails or screws, through its side and into the sides of the studs. The tool gauges the depth of insertion of the box or panel between the studs, by contact with the front surfaces of the studs and the rear surface of the box or panel.

24 Claims, 4 Drawing Figures

MOUNTING UTILITY BOXES, PANELS, AND THE LIKE

BACKGROUND OF THE INVENTION

This invention relates to the mounting of electrical or other utility boxes, panels, or similar housings between wooden studs or equivalent vertical members, as in conventional building framework, and concerns chiefly a tool to simplify and expedite such mounting.

Electrical utility boxes or panels, to be properly mounted, must be held—first temporarily and then permanently—at desired height, depth, and orientation. All this should be accomplished with a minimum of assistance, effort, error, expense, and time. Usually two people are required: one person to hold the item to be mounted, and another person to secure it in place, but one person should be adequate, given the aid of an appropriate tool.

Tools for aiding the mounting of electrical outlet or switch boxes are known that utilize spring bias for gripping a stud and part of such box between the jaws of such a tool, thus temporarily supporting the box against the stud until a more nearly permanent connection can be made, as by nailing through openings in the side of the box to retain it securely in place. Examples of such tools are found in U.S. Pat. Nos. 2,956,798 to Briggs 2,962,281 to Hodgson; 3,154,304 to Crawford and 3,751,026 to Stickney.

Notwithstanding such efforts, mounting of larger boxes, panels, or the like cannot be accomplished with the tools so provided. Nor is it desirable to devise very complex apparatus for this purpose. My invention is designed to answer the apparent needs, but without introducing unwanted complications as so many new tools seem to do.

SUMMARY OF THE INVENTION

In general, the present invention attains its objectives via a self-supporting tool that an operator or user can interpose in part between a pair of flanking wooden studs or equivalent vertical structural members, as in the framework of a building, to support a utility box or panel at the desired height and depth of insertion. The same person then can secure such item to the studding or like structure. More particularly, the tool telescopes laterally and is spring-biased to increased width to hold itself in place temporarily against the sides of the flanking studs. The tool has at its ends front gauging means to contact the aligned front faces of the studs, and it also has rear gauging means to contact the rear and bottom of a box or panel supported on the tool, to ensure that it is at the desired height and depth of insertion. Handles enable the tool to be manually telescoped to decreased width against the spring bias, so as to be removed after the box or panel has been secured in place.

A primary object of the present invention is to enable a person to mount an electrical utility box or panel at desired height and depth of insertion between vertical members of building framework without holding it manually in place or having another person do so.

Another object of this invention is to gauge the position of such a box or panel, especially its depth of insertion between such vertical framework members, while supporting it in place temporarily other than manually.

A further object of the invention is to enable one person to mount such a box or panel better than two can do conventionally.

Yet another object of this invention is to provide a tool for enabling its user to install such a box or panel readily so as to accomplish the foregoing objects without human assistance.

A still further object of the invention is to provide such a tool that is self-supporting while such a box or panel gauged and supported thereby is permanently secured in place, and that then can be removed readily for reuse.

Other objects of this invention, together with means and methods for attaining the various objects, will be apparent from this specification in conjunction with the accompanying drawings. A preferred embodiment of the invention is so presented, but only by way of example rather than limitation.

DETAILED DESCRIPTION

Figure 1:
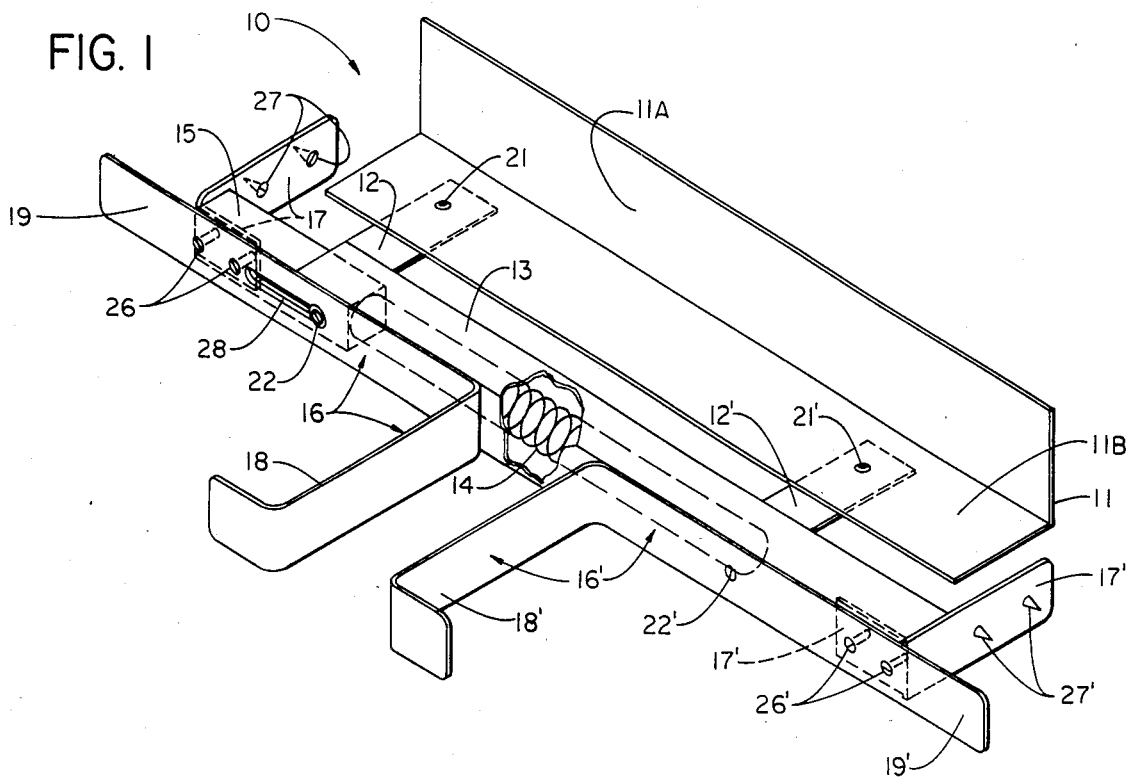
FIG. 1 is a perspective view of a mounting tool according to this invention.

FIG. 1 shows, in perspective, tool 10 of this invention in a normal use orientation but apart from its use environment. Along the rear is rear gauging means 11 (in an angle-iron configuration), including vertical back member 11A and horizontal base member 11B. The base member has pair of angle brackets 12, 12' fastened to its lower face by pair of connectors 21, 21'. Pair of connectors 22, 22' join the brackets to cylindrical member 13 (square cross-section) extending from side to side for a major part of the tool width.

The front of tool 10 is partly cut away in FIG. 1, between striplike front means 16, 16' (extending laterally along all but its middle part) to reveal compression spring 14 coiled inside the cylinder. The spring is restrained at its right end (not visible here) against elongated connecter 22' and at its left end against the right end (also not visible) of slide or piston 15, whose left end protrudes from the left end of the cylinder. The piston is of similar but somewhat smaller cross-section and is much shorter than the cylinder. Front slot 28, through striplike front means 16 and through the right end portion of cylinder 13 and piston 15 inside, extends a short distance to the left after straddling the head of connector 22 at its right. A similar rear slot (28') is scarcely visible in this view but appears in the next view, discussed later.

The left end of the piston and the right end of the cylinder receive and carry respective interior end portions of right-angled side members 17, 17' whose outer portions extend rearward at a right angle to the telescoping direction and to the cylinder and piston. Pair of connectors 26 fasten the inside portion of the left side member to the piston, whereas pair of connectors 26' fasten the inside portion of the right side member to the cylinder. Outside, each side member carries affixed thereto, facing laterally outward, sharp pointed indenting means 27 at the left side and 27' at the right side; their role in supporting the tool is discussed below.

Striplike front means 16 (J-shaped in plan) left of center and 16' (mirror-imaged in plan) at the right are affixed to the front face of the piston and the cylinder by the last mentioned respective connector pairs and by respective connectors 22, 22', which also hold the angle brackets noted previously. The J-hook portions of the striplike means curve frontward, spaced closely enough together to be gripped by one hand and thus to constitute respective left and right handles 18, 18'.

The opposite ends of the striplike front means extend in mutual alignment beyond the opposite ends of the piston and the cylinder (also laterally beyond the attached side members) so as to constitute respective front gauging means 19, 19'. The front and rear gauging means together ensure the proper depth of insertion or interposition of the tool, and a box or panel supported on it, between a pair of studs or other vertical frame members of a building, as explained further below.

Figure 2:
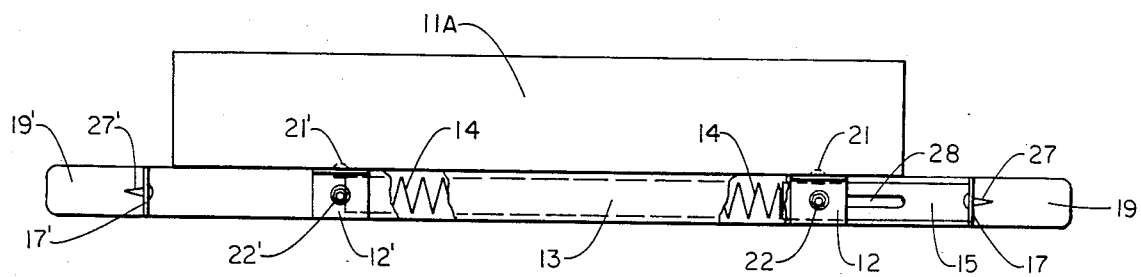
FIG. 2 is a rear elevation of the tool of FIG. 1.

FIG. 2 shows tool 10 in rear elevation, rendering visible a number of the parts hidden or only fragmentarily seen in FIG. 1. Included are rear slot 28' through the piston and an overlying part of the cylinder, angle brackets 12, 12', and (in broken lines) the biasing spring. Of course, the left and right parts of the tool are shown relatively reversed (mirror images) in these two views.

Figures 3, 4:
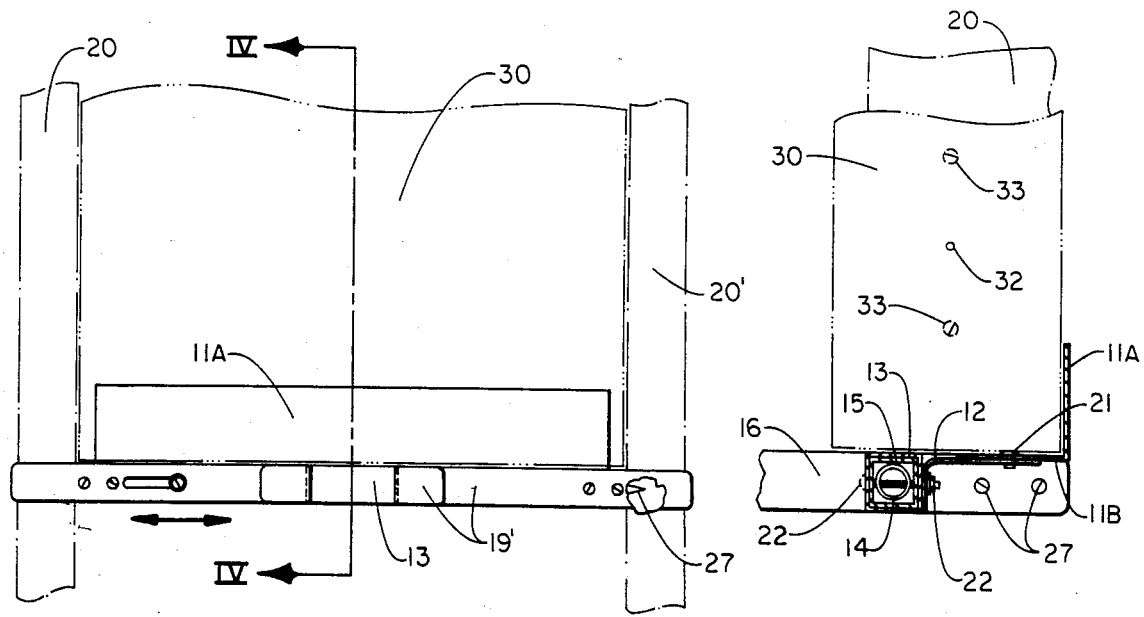
FIG. 3 is a front elevation of the same tool, with a box or panel shown supported thereon between a pair of flanking studs.
FIG. 4 is a side sectional elevation taken at IV—IV on FIG. 3 before removal of the tool.

FIG. 3 shows tool 10 of the preceding views, here in front elevation, between pair of flanking studs 20, 20'. Outward facing pointed indenting means 27, 27' on side members 17, 17' are not visible (except where a stud is partly broken away to show one) because they are indented into the adjacent side of each of the flanking studs under the biasing force of the compression spring. Box or panel 30 (shown in broken lines) rests on horizontal member 11B of rear gauging means 11 of the tool. The rear surfaces of respective front gauging members 19, 19' at the opposite ends of the tool are contiguous with the aligned front surfaces of the studs, and the back of the box or panel is contiguous with the forward face of vertical member 11A of the rear gauging means. Together these gauging means assure proper depth of insertion of the tool and the supported box or panel between the studs, while the user is free to secure the box or panel to the studs.

FIG. 4 shows the same tool in side sectional elevation, as indicated at IV—IV on FIG. 3. This view confirms the contiguity of the rear face of visible gauging member 19' and the front face of stud 20', as well as of the back of box or panel 30 and front surface of vertical member 11A of rear gauging means 11. The front of the box or panel (at the left in this view) is seen to protrude beyond the front surface of the studs, to allow for a layer of dry wall material such as is customarily installed over studding.

Shown further here are the square cross-section of cylinder 13 and of piston 15 therein, the helical shape of compression spring 14 inside the cylinder, and the extent of connector 22, which passes through the piston, the cylinder end portion, and striplike front means 16. Also shown here (in broken lines) are the heads of fastening means 33 extending through a couple of openings 32 in the side wall of box or panel 30 (also shown in broken lines) and into the adjacent stud or equivalent vertical frame member. Such fastening means may be screws, as suggested by slots indicated in their heads here, or may be nails or other equivalent means.

Use of the tool of this invention is readily understood. The tool user, having noted the desired height of the bottom of the electrical box or panel to be mounted, squeezes the handles of the tool together sufficiently so that the points or teeth of the indenting means clear the adjacent parallel sides of a pair of studs between which the box or panel is to be mounted. Next the user inserts the tool until the rear vertical surfaces of the gauging ends of the tool touch the front faces of the studs. The user then releases the handles, whereupon the tool expands laterally and seats itself in the studs. The user places the box or panel onto the tool, taking care that its back abuts the vertical member of the tool's rear gauging means to ensure proper insertion depth of the box or panel relative to the studding. Next the operator inserts nails, screws, or similar fastening means through openings in the box or panel (or in flanges or the like, if any, attached to it) and into the studs. Then the user squeezes the handles together to release the teeth-like indenting means from the sides of the studs, and removes the tool for reuse.

Such a procedure is simpler than having one person hold such a box or panel in position and another person fasten it in place. Of course, paying only one person to do so saves part of the usual cost. Moreover, once the tool is placed accurately, the box or panel supported on it is in the desired position as to height, depth of insertion between the studs (or like vertical members), and level orientation. The quality of the work is improved by eliminating the possibility of misplacement due to a lack of coordination or understanding, such as may occur when more than one person is involved in doing the actual mounting.

The tool itself can be fabricated from ordinary sheet metal as it requires no special materials or methods of construction. Alternatively, it may be made from cast or molded metal or even plastic parts if desired. The spring may be of any suitable diameter, length, number of turns, and composition. Ordinary spring steel having about a dozen turns, about half a foot long, and about an inch in diameter is suitable. When the spring is released from manual compression it should be resilient enough to force the tool's pointed teeth into a wooden stud far enough (e.g., about a fourth inch) to hold both the tool and a utility box or panel on it in place unaided—at least long enough for the user to secure the box or panel permanently to the flanking vertical members of building framework or the like.

It will be understood that the illustrated embodiment of the tool of this invention is intended for use chiefly by right-handed persons, inasmuch as the tool usually is grasped with the palm of the hand underneath the handles. In this position the fingers of the right hand grip the left handle, affixed to the piston, and contract to telescope the piston to the right, into the cylinder. The heel of the thumb of the right hand hardly moves, thus holding the body of the tool (the cylinder, the rear gauging means, and the right front gauging member, etc.) more nearly motionless. For a left-handed person, a mirror-image embodiment of the tool can be readily provided, with the piston at the right instead of the left.

Conventional spacing of wooden studding (as on sixteen-inch centers) dictates not only the lateral extent of this tool but also the width of many electrical boxes or panels to fit between such studs with modest clearance. Of course, the sizes can be altered to accommodate other vertical member spacing in new or existing construction. In addition to electrical utility boxes and panels, utility housings of dissimilar function but similar shape may be mounted likewise, such as medicine cabinets, for example.

Although the invention has been described mainly in terms of a preferred embodiment, the configuration and the dimensions of the tool, as well as the procedure of using it or an equivalent thereof, could be changed within reasonable limits, as noted above. Indeed, other modifications could also be made, as by adding, combining, deleting, or subdividing parts or steps, while retaining at least some of the advantages and benefits of the invention, which itself is defined in the following claims.

The claimed invention is:

1. Tool for mounting a utility box or panel between a pair of vertical structural members of a building or the like, comprising
   laterally telescoping means biased toward increased width,
   means so biasing such telescoping means laterally outward,
   the telescoping means including
      mutually parallel side members laterally extending to increased width under such bias to make supporting contact with the sides of such a pair of vertical structural members when the tool is partly interposed therebetween, and
      a pair of mutually aligned front gauging members laterally extending to increased width under such bias to make gauging contact with the fronts of a pair of vertical structural members when the tool is otherwise partly interposed therebetween.

2. Mounting tool according to claim 1, wherein such mutually aligned front gauging members extend further laterally than the rest of the tool under any lateral extension.

3. Mounting tool according to claim 1, including also a back gauging member located at fixed front-to-rear distance from the alignment line of the mutually aligned front gauging members.

4. Tool for mounting a utility box or panel bewteen a pair of vertical structural members of a building or the like, comprising
   laterally telescoping means biased toward increased width,
   means so biasing such telescoping means laterally outward,
   the telescoping means including a pair of mutually aligned front gauging members laterally extending to increased width under such bias to be juxtaposed into gauging contact with the fronts of a pair of vertical structural members when the tool is otherwise partly interposed therebetween.

5. Mounting tool according to claim 4, including also a back gauging member located at fixed front-to-rear distance from the alignment line of the mutually aligned front gauging members.

6. Mounting tool according to claim 5, wherein such telescoping means includes mutually parallel side members interposed between the sides of such a pair of vertical structural members and laterally extending to increased width under such bias to make supporting contact with the sides of such a pair of vertical structural members when the front gauging members are juxtaposed into gauging contact with the fronts of such vertical structural members.

7. Mounting tool according to claim 6, wherein such sides of the vertical structural members are indentable, and the telescoping side members of the tool comprise indenting means oriented toward such sides of such pair of vertical structural members when the tool is partly interposed therebetween.

8. Portable tool for mounting an electrical box or panel between flanking wooden studs of a building or the like, comprising
   manually compressible spring means normally biasing the tool to extended width,
   telescoping means so biased to extended width, having
      mutually aligned front gauging members laterally extendible to make gauging contact with front surfaces of such studs when the tool is juxtaposed thereto, and
      mutually parallel side members closer together than the front gauging means and laterally extendible therewith to make supporting contact with the sides of such studs upon being interposed therebetween when the front gauging members are juxtaposed to the front surfaces of such studs and thereby temporarily support the mounting tool immovably.

9. Mounting tool according to claim 8, including back gauging means, in fixed relation to an extremity of the telescoping means, and having a vertical member parallelling the telescoping direction for engaging the back of such a box or panel while the front gauging members are in gauging contact with the front surfaces of the studs.

10. Mounting tool according to claim 9, wherein the back gauging means also has a horizontal member for supporting such a box or panel whose back is engaged by such vertical member of the back gauging means.

11. Mounting tool according to claim 8, wherein such side members include indenting means oriented outward toward the sides of the studs when interposed therebetween and effective to indent them when the tool is biased to extended length by the spring.

12. Mounting tool according to claim 11, wherein such indenting means is disengageable from the indented sides of the studs under manual compression of the telescoping means counter to the spring bias.

13. Mounting tool according to claim 12, wherein such telescoping means includes a cylinder surrounding the spring means and carrying one handle, one of such front gauging members, and one of such side members.

14. Mounting tool according to claim 13, wherein such telescoping means includes a piston fitting within such cylinder and carrying another handle, the other front gauging member, and the other side member.

15. Mounting tool according to claim 14, wherein the pair of handles, respectively in fixed relation to the cylinder and the piston of the telescoping means, are capable of being manually squeezed together against the spring bias to narrow the tool.

16. Portable tool for mounting an electrical box or panel between flanking structural members of a building or the like, comprising
   manually compressible biasing compression spring means;
   telescoping means including
      a cylinder, fitting about the spring means, and carrying
         a first handle,
         a first front gauging member oriented parallel to the telescoping direction and beyond the near end of the cylinder, and
         a first indenting side member oriented perpendicular to the telescoping direction and having indenting means outward beyond the near end of the cylinder; also a piston, fitting movably within the other end of the cylinder and against an end of the spring, and carrying a second handle member, a second front gauging member oriented parallel to the telescoping direction and beyond the adjacent end of the cylinder, and a second indenting side member oriented perpendicular to the telescoping direction and having indenting means oriented outward beyond the adjacent end of the cylinder.

17. Mounting tool according to claim 16, including also back gauging means, in fixed relation to the cylinder, and comprising a vertical member for engaging the back of such a box or panel in cooperation with the front gauging members for gauging its proper depth relative to the flanking structural members, and a horizontal member for engaging the bottom of such a box or panel to support it for mounting.

18. Mounting tool according to claim 16, wherein the handles are capable of being manually compressed toward one another to overcome the spring bias so as to enable the tool to have its front gauging members be juxtaposed to the front surfaces of such a pair of vertical structural members, and to enable its indenting side members to be interposed simultaneously between the sides of such vertical structural members and to expand into indenting contact within upon being released from such manual compression.

19. Method of mounting an electrical utility box or panel between a pair of wooden studs spaced slightly further apart than the width of such box or panel, with a tool according to claim 20, comprising the steps of positioning the tool at the desired height relative to the studs, squeezing the handles together to overcome the spring bias and telescope the piston into the cylinder until the indenting side members are spaced closer together than the adjacent sides of the respective studs while the front gauging members overlap the front surfaces of the studs, juxtaposing the front gauging members against the front surfaces of the respective studs and releasing the handles until the spring bias seats the indenting side members into the sides of the studs, placing the box or panel on the horizontal member of the back gauging means with the back of the box or panel against the vertical member of the back gauging means to be supported thereby, inserting fastening means through the sides of the box or panel and into the sides of the studs to secure the box or panel in place, squeezing the handles to withdraw the indenting side members from the sides of the studs, and manually removing the tool for reuse.

20. Method of mounting a utility box or panel between a pair of vertical structural members of a building or the like, comprising the steps of placing a laterally telescoping mounting tool at a selected mounting height relative to the structural members telescoping the tool laterally to sufficiently narrow width to juxtapose front gauging members of the tool against front surfaces of such structural members, while interposing side supporting members of the tool between the sides of the structural members, expanding the tool laterally against side surfaces of such structural members and thereby bringing its side supporting members into supporting contact therewith, thereby enabling a box or panel to be supported by the tool while being secured to such structural members, placing a box or panel on the tool, thereby supporting it temporarily, and securing the box or panel in place by inserting fastening means through openings in the sides of the box or panel and into the sides of the vertical structural members.

21. Method of mounting a utility box or panel according to claim 20, including positioning front gauging members of the tool against aligned front surfaces of such structural members before expanding the tool against the sides of such members.

22. Method of mounting a utility box or panel according to claim 21, including positioning the box or panel on the tool with its back in gauging contact at known depth relative to the front gauging members before expanding the tool against the sides of the vertical structural members.

23. Method of mounting a utility box or panel according to claim 20, including the step of indenting the sides of the vertical supporting members when expanding the tool thereagainst and into supporting contact therewith.

24. Method of mounting a utility box or panel according to claim 20, including then telescoping the tool to disengage it from the sides of the flanking structural members for subsequent reuse.

* * * * *